Sept. 12, 1933.  A. WEIDER  1,926,469
FILM PACK
Filed Dec. 10, 1930  2 Sheets-Sheet 1
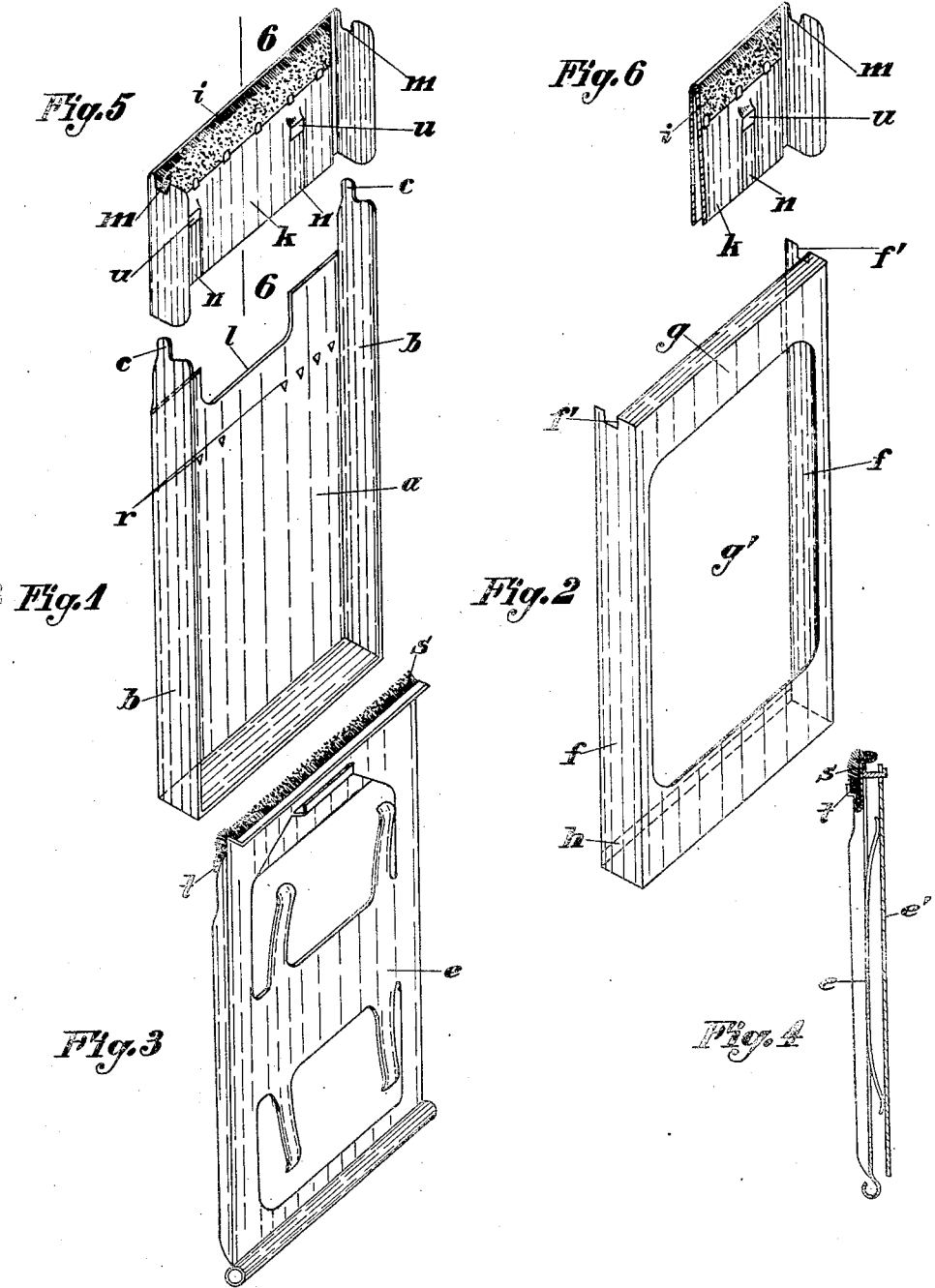

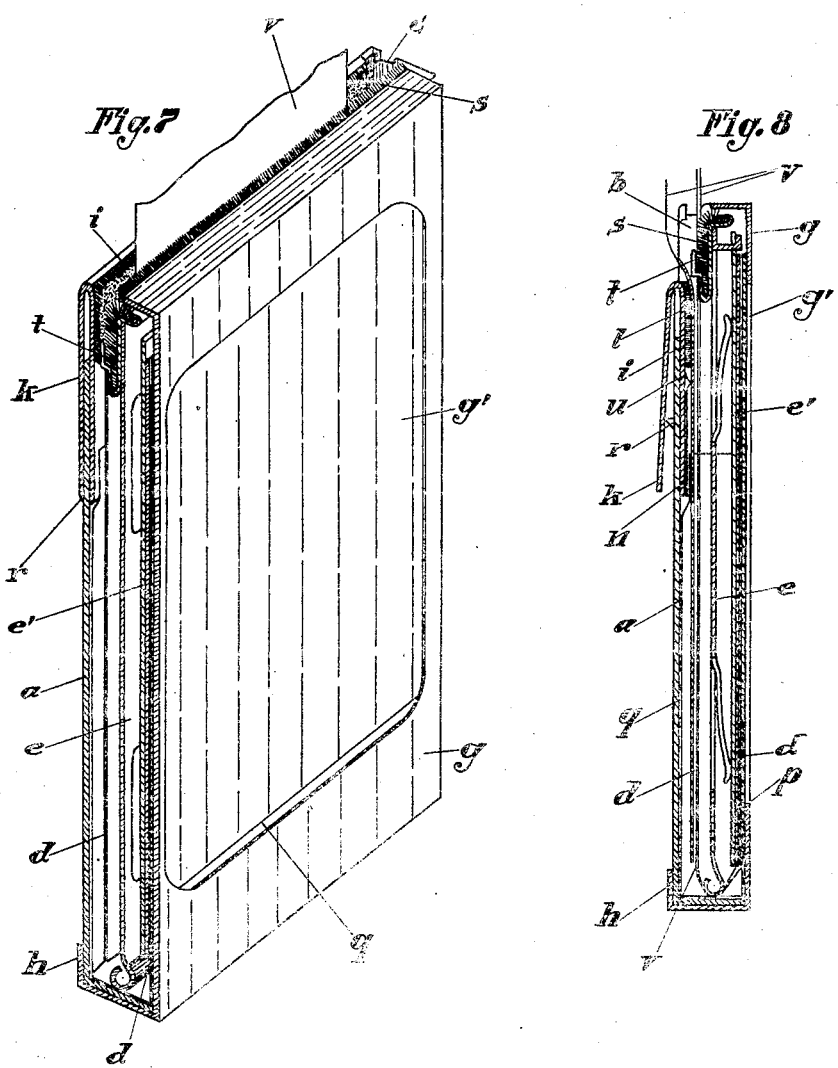

Patented Sept. 12, 1933

1,926,469

UNITED STATES PATENT OFFICE 1,926,469

FILM PACK

Adam Weider, Remscheid-Lennep, Germany, assignor to the firm Barmer Maschinenfabrik Aktiengesellschaft, Wuppertal-Oberbarmen, Germany, a corporation of Germany Application December 10, 1930, Serial No. 501,440, and in Germany August 4, 1930

2 Claims. (Cl. 95—22)

This invention relates to a film pack, having a front and a rear wall of sheet metal, between which a spring frame is situated for accommodating the film sheets. Such film packs are known. They are however open to the objection that, for removing an exposed film, a removable closing element is provided, the manipulation of which is extremely difficult in the dark room, as it can only be replaced with difficulty and easily becomes mislaid in the darkness. It has already been proposed, to make film packs without removable closing elements, in which for removing the exposed films either the film pack is opened or the front and rear walls are respectively shifted. The first form of construction is however open to the objection that, when removing an exposed film, the film pack can easily fall apart. In the second form of construction the shifting of the front and rear walls can easily result in a shifting or buckling of the films, so that they are damaged. In order to avoid these objections, it has been proposed, to make completely closed film packs, which have hinged covers at the tops. These are however open to the objection that a removal of the exposed films or an inserting of unexposed films is very difficult, as the film pack cannot be taken apart for inserting and as for removing the exposed films are not free at their upper ends.

These objections are overcome according to the invention which consists of a film pack made of sheet metal, the parts of which are rigidly connected together, after the inserting of the film sheets, by means of tongues adapted to be folded over, the novelty consisting in that the closing slide enabling the removal of exposed films is so guided that it can be slipped downwards, without being detached. The tongues connecting the front wall to the rear wall are so arranged that they prevent the closing slide from being pulled off in upward direction, and serve as stops for this slide in upward direction. The slide proper consists of a U-shaped piece of sheet metal, which is slipped from above over the rear wall, which has small projections adapted to resiliently hold the closing slide in closing position.

The advantages of the invention consist in that, for removing exposed films, it is only necessary to slide the closing slide downwards, so that it is no longer necessary to remove a detachable part of the film pack. A further advantage consists in that during the shifting of the closing slide the films are not strained in the least so that a shifting or buckling thereof cannot occur.

An embodiment of the invention is illustrated by way of example in the accompanying drawings, in which:

Fig. 1 shows the rear wall of the film pack in perspective view.

Fig. 2 shows the front wall of the film pack also in perspective view.

Fig. 3 shows in perspective view the spring frame for holding the film sheets.

Fig. 4 is a vertical section of Fig. 3, the pressing cover being hung on.

Fig. 5 shows in perspective view the closing slide on the rear wall of the film pack.

Fig. 6 is a similar view to Fig. 5 sectioned along line 6—6 of Fig. 5.

Fig. 7 is a perspective view of the film pack put together in closed condition, the side wall being cut away.

Fig. 8 is a vertical section through the middle of Fig. 7, showing the closing slide pushed down for the removing of exposed films.

The film pack consists of a rear wall $a$ with side walls $b$ connected thereto. On the top end of the side walls $b$ tongues $c$ are provided. A closing slide $k$ is pushed over the rear wall $a$, and consists of a piece of sheet metal the two side ends of which are folded over at right angles and it is held in the closing position by projections $r$ on the inner surface of the rear wall $a$.

Bulged out portions $n$ on the inner surface of the closing slide $k$ serve to securely guide this closing slide on the rear wall of the film pack. The closing slide can be shifted in downward direction only if the front wall of the film pack has been pulled forward, so that the closing slide can pass over the projections $r$. The shifting movement of the closing slide is limited by a cut out portion $l$ in the rear wall $a$. A spring frame $e$ carrying a loosely suspended pressing plate $e'$ for uniformly pressing against the films is inserted into the rear wall $a$ and designed to hold the films $d$. The pressure plate $e'$ (Fig. 4) is designed to ensure a flat bearing of the films against the picture aperture. The rear wall $a$ together with the spring frame $e$ are inserted into the front wall $g$, which has the picture aperture $g'$ and is held in this position by the horizontal lower end $h$ of the front wall. Incisions $f$ in the upper edge of the side walls $f$ of the front wall $g$ serve to securely close the film pack, the tongues $c$ of the rear wall engaging in these incisions $f'$ when they are folded inwards so that falling asunder of the film pack is prevented. The inwardly folded tongues $c$ prevent further the closing slide $k$ from being pulled off the rear wall $a$ in upward direction, as these folded over tongues engage also in incisions $m$ in the upper edges of the forwardly bent sides of the closing slide. Felt bands $i$ and $s$ respectively are arranged on the upper ends of the closing slide $k$ and the spring frame $e$ respectively, to ensure light-tightness of the film pack, the paper strips $v$ attached to the film sheets projecting between these felt bands $i$ and $s$. The spring frame $e$ has rearwardly directed flaps $t$ adapted to bear against the projections $n$ on the inner surface of the closing slide $k$.

The film sheets $d$, pressed by the pressing plate $e'$ against the picture aperture $g'$, are for the exposure successively pulled towards the rear around the lower edge of the spring frame by means of the projecting paper strips $v$ and pressed against the spring frame $e$ by the projections $u$ of the closing slide $k$ so that pulling out of the same is prevented by the projections $t$ on the spring frame. If however exposed films have to be removed, the closing slide $k$ is shifted in downward direction by being lifted so that it clears the projections $r$, whereby the flaps $t$ of the spring frame $e$ are liberated. The exposed film sheets $d$ can then be taken out without difficulty. The closing of the film pack is effected in a similar manner in that the closing slide $k$ is pushed again in upward direction, pulling the same off the film pack being prevented by the folded over tongues $c$. The film pack according to the invention forms therefore a perfectly closed and solid film pack from which exposed film sheets may be easily removed without the necessity of removing any of the elements of which the film pack is composed.

I claim:

1. A film pack, the metal parts of which are connected rigidly after the insertion of the film book, comprising in combination a front wall of sheet metal having a picture aperture, a rear wall of sheet metal, a closing slide on said rear wall having the side portions bent forward at right angles, adapted to be shifted, and inwardly folded tongues on the upper ends of said side walls of said rear wall adapted to prevent said closing slide being removed from said rear wall and to allow the removal of exposed films from said casing.

2. A film pack, comprising in combination with the rear wall, the closing slide the front wall and the tongues connecting said rear wall to said front wall, said closing slide of sheet metal having its side portion bent rearwards at right angles slipped from above over said rear wall, small projections on said rear wall adapted to hold said closing slide in the closing position.

ADAM WEIDER.